US008857270B2

(12) United States Patent
Zhu et al.

(10) Patent No.: US 8,857,270 B2
(45) Date of Patent: *Oct. 14, 2014

(54) METHOD FOR DETECTING PLUGGING IN A CORIOLIS FLOW MEASURING DEVICE

(75) Inventors: Hao Zhu, Freising (DE); Wolfgang Drahm, Erding (DE); Alfred Rieder, Landshut (DE)

(73) Assignee: Endress + Hauser Flowtec AG, Reinach (CH)

( * ) Notice: Subject to any disclaimer, the term of this patent is extended or adjusted under 35 U.S.C. 154(b) by 459 days.

This patent is subject to a terminal disclaimer.

(21) Appl. No.: 13/227,831

(22) Filed: Sep. 8, 2011

(65) Prior Publication Data

US 2012/0222479 A1    Sep. 6, 2012

(30) Foreign Application Priority Data

Sep. 10, 2010  (DE) .......................... 10 2010 040 598

(51) Int. Cl.
G01F 1/84 (2006.01)
G01F 1/68 (2006.01)

(52) U.S. Cl.
CPC ............ *G01F 1/8436* (2013.01); *G01F 1/8477* (2013.01)
USPC .................................. 73/861.355; 73/204.11

(58) Field of Classification Search
None
See application file for complete search history.

(56) References Cited

U.S. PATENT DOCUMENTS

| | | | |
|---|---|---|---|
| 5,918,268 A | 6/1999 | Lukas | |
| 8,359,933 B2 * | 1/2013 | Drahm et al. | 73/861.357 |
| 2011/0113896 A1 * | 5/2011 | Drahm et al. | 73/861.357 |
| 2013/0031973 A1 * | 2/2013 | Kirst et al. | 73/204.11 |

FOREIGN PATENT DOCUMENTS

| | | |
|---|---|---|
| DE | 10 2005 050 898 A1 | 5/2007 |
| WO | WO 2008/142075 A1 | 11/2008 |
| WO | WO 2009/051588 A1 | 4/2009 |
| WO | WO 2009/134268 A1 | 11/2009 |
| WO | WO 2010/085972 A1 | 8/2010 |

OTHER PUBLICATIONS

International Search Report, Jan. 27, 2012.
International Preliminary Report on Patentability in PCT/EP2011/063654, issued Mar. 12, 2013, English translation thereof.

* cited by examiner

*Primary Examiner* — Harshad R Patel
(74) *Attorney, Agent, or Firm* — Bacon & Thomas, PLLC

(57) ABSTRACT

A method for detecting plugging of a measuring tube. Heat is supplied to a medium conveyed in a first measuring tube by means of at least one heating element, or heat is removed from the medium conveyed in a first measuring tube by means of at least one cooling element. At least one temperature sensor, which is thermally coupled to the medium conveyed in the first measuring tube, temperature is registered. Additionally, a first comparison variable, which is characteristic for heat transport by the medium in the first measuring tube, is determined based on the supplying of heat or removing of heat, as well as on the temperature registering, and this comparison variable is compared with a reference variable. Plugging of at least one measuring tube of the measuring transducer is detected if the first comparison variable deviates from the reference variable by more than a limit value.

17 Claims, 3 Drawing Sheets

METHOD FOR DETECTING PLUGGING IN A CORIOLIS FLOW MEASURING DEVICE

TECHNICAL FIELD

The invention relates to a method for detecting complete or partial plugging of a measuring tube of a measuring transducer of vibration type of a flow measuring device, as well as to a correspondingly embodied flow measuring device, wherein the measuring transducer is flowed through by medium and has at least two measuring tubes connected for parallel flow and excitable, during use, to execute mechanical oscillations.

BACKGROUND DISCUSSION

Such measuring transducers are especially applied in Coriolis-flow measuring devices. According to the Coriolis principle, whenever, in a system, a rotating mass movement and a straight line mass movement extending at least partially perpendicular to the rotational axis superimpose, an additional force always acts on the moved mass; this force is referred to as the Coriolis force. This effect is utilized in known manner in Coriolis flow measuring devices, for example, in order to determine a mass flow of a medium flowing in a pipeline. During use, such Coriolis flow measuring devices are, as so called inline-measuring devices, inserted in a pipeline flowed through by the respective medium.

Frequently, measuring transducers are applied in Coriolis flow measuring devices having two measuring tubes connected for parallel flow, between which a medium flowing in the pipeline is divided. As a rule, during use, the two measuring tubes are excited with opposite phase relative to one another. In this way, a decoupling of the oscillatory system which has the two measuring tubes from external vibration influences is achieved. Additionally, a measuring transducer of a Coriolis flow measuring device can also have more than two measuring tubes, such as, for example, four measuring tubes connected for parallel flow. In such case, in industrial applications, the situation can occur that (at least) one of the measuring tubes of such Coriolis flow measuring devices becomes completely or partially plugged. This case arises especially when a high-viscosity medium, an inhomogeneous medium and/or a medium tending to form accretions flows in the relevant pipeline.

Such a plugging is difficult to detect, since flow is still possible through the at least one remaining, free measuring tube. Even in the case of complete plugging of one of the measuring tubes, performing a Coriolis mass flow measuring with the Coriolis flow measuring device is still possible. Especially, plugging of a measuring tube is not directly recognizable based on the determined mass flow value. It is, however, desirable to detect plugging of a measuring tube in Coriolis flow measuring devices as reliably and early as possible. This need exists especially in the case of hygienically critical applications and/or in the case of applications in which the medium conveyed in the relevant pipeline changes, and a mutual contamination should be prevented.

In the publication WO 2009/134268 A1, a flow-measuring device is described, by which deviation of a flow measuring device parameter is detectable. Such deviation of a flow measuring device-parameter can be brought about, among other things, by plugging of a measuring tube. In the case of a described method, temperature is registered at a first as well as at a second measuring tube of the flow measuring device, and a temperature gradient is ascertained therefrom. Deviation in a flow measuring device parameter is detected when the ascertained temperature gradient exceeds a limit value.

SUMMARY OF THE INVENTION

Accordingly, an object of the present invention is to provide a method and a Coriolis flow measuring device, via which complete or partial plugging of a measuring tube of measuring transducer having a number of measuring tubes is detectable as reliably and early as possible.

The object is achieved by a method for detecting complete or partial plugging of a measuring tube of a measuring transducer of vibration type of a flow measuring device, as well as by a flow measuring device.

In the present invention, a method is provided for detecting complete or partial plugging of a measuring tube of a measuring transducer of vibration-type of a flow measuring device, especially a Coriolis-flow measuring device. The measuring transducer is, in such case, flowed through by medium, and includes at least two measuring tubes connected for parallel flow. During use, the measuring tubes are excitable to mechanical oscillations. The method includes steps as follows:

A) Supplying, by means of at least one heating element, heat to medium conveyed in a first measuring tube or removing, by means of at least one cooling element, heat from medium conveyed in a first measuring tube,
B) registering temperature by means of at least one temperature sensor, which is thermally coupled to medium conveyed in the first measuring tube;
C) determining a first comparison variable, which is characteristic for heat transport by medium in the first measuring tube, based, respectively, on the supplying of heat or the removing of heat and the registering of temperature, and comparing the first comparison variable with a reference variable;
D) detecting plugging of at least one measuring tube of the measuring transducer, if the first comparison variable deviates from the reference variable by more than a limit value.

Via the method of the invention, a measure for the heat transport by the medium flowing in the first measuring tube is determined. The heat transport depends, in such case, on the flow—especially on the mass flow—of the medium within the first measuring tube. If the flow in the first measuring tube is reduced due to a partial plugging of the first measuring tube or is completely suppressed due to a complete plugging of the first measuring tube, the heat transport by the medium conveyed in the first measuring tube is then also correspondingly reduced. If, in contrast, the flow in the first measuring tube is increased due to a partial or complete plugging of at least one other measuring tube, the heat transport by the medium flowing in the first measuring tube is increased. Since, according to the method of the invention, a first comparison variable is determined, which is characteristic for heat transport by the medium conveyed in the first measuring tube, and this variable is compared with a reference variable, it can be detected in simple manner whether the heat transport by the medium conveyed in the first measuring tube is increased or reduced in comparison to a value to be expected (i.e. the reference variable). Accordingly, in the case of occurrence of a significant deviation (between the first comparison variable and reference variable), plugging of at least one measuring tube can reliably be detected. The limit value (for the deviation between the first comparison variable and the reference variable) can, in such case, be selected correspondingly according to desired sensitivity and according to application.

Since, in the method of the invention, heat is supplied to or removed from the medium in the first measuring tube via a heating element or cooling element, respectively, the method of the invention is put into practice reliably and independently of the thermal boundary conditions in each case present, since, depending on use of a flow measuring device, the medium flowing through the flow measuring device can have a temperature different from—or also the same as—the environment, the measuring tubes of the flow measuring device, etc. Additionally, the respective temperatures can also fluctuate over time.

In connection with the present invention, it is sometimes mentioned that "at least one" component is provided. In the case of these components, during the course of additional discussions herein, it is intended that the possibility of the provision of more than one component is understood, even when such is not explicitly mentioned each time.

The method of the invention relates to a flow measuring device having a measuring transducer of vibration type. A measuring transducer of vibration type generally serves, in such case, to produce mechanical reaction forces, e.g. mass flow dependent, Coriolis forces, density dependent, inertial forces and/or viscosity dependent, frictional forces, in a medium flowing through. These mechanical reaction forces, in turn, are registerable via sensor. A typical manner of operation such of a flow measuring device is described as follows: All (here at least two) measuring tubes are excited by at least one exciter to execute mechanical oscillations. In such case, the fundamental mode of bending oscillations can especially be excited. Additionally, the mechanical oscillations of the measuring tubes are registered by at least one (as a rule, at least two, spaced along the direction of elongation of the measuring tubes) oscillation sensor(s). The sensor signals provided by the at least one oscillation sensor are evaluated by an electronics of the Coriolis flow measuring device. The operating of the exciter occurs, as a rule, likewise via the electronics.

The flow measuring device is embodied especially as a Coriolis flow measuring device. Via a Coriolis flow measuring device, the mass flow of the medium through the Coriolis flow measuring device is determinable making use of the Coriolis principle. If the measuring tubes are not flowed through by medium, upon excitation of the measuring tubes to execute mechanical oscillations, they oscillate in phase (along their respective directions of elongation). If the measuring tubes are flowed through by a medium (with a flow velocity greater than zero), this then leads to the measuring tubes being supplementally deformed due to the Coriolis force acting on the flowing medium. This phase shift occurring along the direction of elongation of the measuring tubes can be registered by the at least one oscillation sensor. For example, at least two oscillation sensors arranged spaced from one another along the direction of elongation of the measuring tubes can be provided. The phase shift is proportional to the mass flow.

Via a flow measuring device of vibration-type, also a density and/or a viscosity of the flowing medium can additionally or alternatively be determined. For determining the density of the medium, the principle is utilized that the resonance frequency (for example of the fundamental mode of the bending oscillation) depends on the oscillating mass, and therewith on the density of the flowing medium. Independent of which physical measured variable (mass flow, density, viscosity, etc.) is actually presently determined or generally determinable by a flow device, such flow measuring devices with a measuring transducer of vibration-type are frequently generally referred to as Coriolis flow measuring devices.

By a "complete plugging" of a measuring tube is meant a state, in which no more flow is possible through the measuring tube in question. By a "partial plugging" of a measuring tube is meant a state, in which the flow through the measuring tube in question is reduced. A partial plugging can be formed, for example, by a layer formation or by deposits of the medium within the relevant measuring tube. If, in the present relationship, a general "plugging" is referred to, reference is in such case made to both the possibility of a complete, as well as also of a partial plugging.

The "medium" can be completely or also only partially formed by a liquid, a gas or a mixture of liquid and gas. The liquid, the gas or the mixture of liquid and gas can especially also entrain solid particles (for example, pneumatically transported dust, solid particles in gas, solid particles in liquid, etc.).

The supplying or removing of heat to or from the medium conveyed in the first measuring tube can occur directly at the medium. In this case, the heating element or cooling element is especially arranged within the first measuring tube (or, in given cases, also shortly upstream from the same) in direct contact with the medium. Additionally, the supplying or removing of heat can also occur mediately, especially via the first measuring tube. In the latter case, the heating element or cooling element can especially be arranged on the outside of the measuring tube wall of the first measuring tube, or extend at least partially through the measuring tube wall of the first measuring tube. In corresponding manner, also in the case of the temperature sensor, which is thermally coupled to the medium conveyed in the first measuring tube, it is not mandatory that this element b arranged inside of the first measuring tube and be in direct contact with the medium. The temperature sensor can especially be arranged within the first measuring tube or on the outside of the measuring tube wall of the first measuring tube, or it can extend completely or partially through the measuring tube wall of the first measuring tube. Preferably, the temperature sensor is more strongly thermally coupled to the medium conveyed in the first measuring tube than to the medium conveyed in the remaining measuring tubes. There additionally exists the opportunity that the temperature sensor additionally is applied in the flow measuring device for registering temperature of the medium, in order to perform, based on the registered temperature, temperature compensation during the determining of the physical measured variable (e.g. mass flow, density and/or viscosity) in the flow measuring device. Additionally, a number of temperature sensors can also be provided on the first measuring tube, so that also a spatial temperature distribution is registerable. The step of registering the temperature (step B)) by the at least one temperature sensor can be performed especially at the same time, or offset in time to (i.e. after) the step of supplying or removing heat (step A)).

In general, it is preferable that the heating element or cooling element as well as the temperature sensor are arranged in the region of the first measuring tube, especially not significantly upstream or downstream from the same. In the case of the heating element or cooling element, it can also be provided that this element is arranged upstream from the branching through which the flow is divided between a number of measuring tubes.

The determined comparison variable is a variable, which is characteristic for the heat transport by the medium conveyed in the corresponding measuring tube. In such case, as is also made clear by means of the further developments explained below, different variables can basically be used as a comparison variable for the detection method of the invention. Which variable(s) is/are suitable depends among other things on the exact performance of the steps of supplying or removing of heat (compare step A)), as well as on the registering the temperature (compare step B)). The comparison variable can be formed by an individual value or also by a value curve (e.g. a curve of temperature rise or of temperature drop in each case plotted versus time). In a corresponding manner, the reference variable can also be formed by an individual value or a value curve. The limit value can especially be a limit value stored in the flow measuring device. It can, in such case, be a fixed value. Alternatively, the limit value can also be determined as a function of other variables, such as, for example, an actual mass flow of the medium through the flow measuring device, an ambient temperature or a temperature of the medium, thermal properties of the medium and/or of the particular application, etc. The limit value can also be adjustable by a user, depending on desired sensitivity.

The temperature sensor and the heating element can, in such case, be formed by one and the same element. As is known to those skilled in the art, a correspondingly embodied and operated resistance heating element can, for example, also be operable as temperature sensor. Alternatively, the temperature sensor and the heating element can also be embodied as separate elements.

If, in the case of step D), plugging of at least one measuring tube of the measuring transducer is detected, this can, for example, be signaled to a user (e.g. via an on-site display on the flow measuring device) and/or to a superordinated control unit connected via a network, this control unit performing a process control and/or a monitoring of a plurality of field devices connected in communication with one another.

There additionally exists the opportunity to perform the method of the invention not only on one measuring tube, but instead to perform the method on a plurality of measuring tubes of the flow measuring device. Additionally, the method can be put into practice independently of the particular shape and number (at least two) of the measuring tubes, the oscillation mode in each case excited and the physical measured variable (mass flow, density, viscosity, etc.) in each case registered by the flow measuring device. In a further development, it is provided that the method of the invention is performed periodically, especially in predetermined time intervals. For example, the method is started automatically by the electronics after the elapse of a predetermined time interval.

In a further development, the reference variable is a variable which was determined earlier and can be called up from memory. Especially, the memory can be provided in the flow measuring device itself. The reference variable can, in such case, also be determined as a function of other variables, such as, for example, an actual flow rate of the medium through the flow measuring device, an ambient temperature or a temperature of the medium, thermal properties of the medium and/or the particular application.

In a further development, the method additionally includes steps as follows:
E) Detecting plugging of the first measuring tube, when the determined first comparison variable deviates from the reference variable in such a manner that, in the first measuring tube, a reduced heat transport by the medium occurs; and/or
F) detecting plugging of at least one other measuring tube of the flow measuring device, when the determined first comparison variable deviates from the reference variable in such a manner that, in the first measuring tube, an increased heat transport by the medium occurs.

As explained above, the first comparison variable is characteristic for or a measure for the heat transport by the medium in the first measuring tube. This heat transport depends, in turn, on the flow through the first measuring tube. As a function of the direction of the deviation between the comparison variable and reference variable, it can thus be determined whether the first measuring tube or at least one of the remaining measuring tubes is plugged.

In a further development, the first comparison variable is a flow rate through the first measuring tube determined based on the supplying of heat or removing of heat as well as on the temperature registering, and the reference variable is a flow rate expected for the first measuring tube, which is determined based on a mass flow rate through the entire flow measuring device registered according to the Coriolis principle. In corresponding manner, other variables obtainable via solving mathematical equations—such as, for example, a mass flow rate—can also be taken into consideration as comparison variable and reference variable. In such case, different options exist for determining the flow rate through the first measuring tube based on the supplying of heat or removing of heat, as well as on the temperature registering. Especially, methods and measuring arrangements known from thermal mass flow measuring can be applied. The determining of the mass flow rate through the entire flow measuring device can occur in the known manner in the context of a Coriolis mass flow measurement, especially as is explained above by way of example.

In a further development, the steps of supplying or removing heat (step A)) as well as of registering temperature (step B)) are performed In corresponding manner on at least a second measuring tube of the measuring transducer, wherein, based thereon, at least a second comparison variable, which is characteristic for heat transport by the medium in the second measuring tube, is determined, and this second comparison variable is taken into consideration as a reference variable for comparison with the first comparison variable. In this way, a difference in the heat transport by the medium in the different measuring tubes, and therewith plugging of at least one measuring tube can be detected especially reliably. Preferably, in the case of at least a second measuring tube, which is preferably is embodied with equal construction to and mirror symmetrically to the first measuring tube, the steps of supplying or removing heat (step A)), of registering the temperature (step B)) as well as of determining a corresponding comparison variable are performed in an equal manner to that in the case of the first measuring tube. In this case, the first and second comparison variables are directly comparable. In such case, the method is preferably performed parallelly in time on the second measuring tube. Fundamentally, it can, however, also be performed offset in time. Regarding the structural embodiment, a mirror-symmetric embodiment of the measuring transducer is generally preferable, especially a mirror symmetric arrangement of the (for example two) measuring tubes, the heating elements or cooling elements, as well as the temperature sensors. In a further development, it is provided that at least a first heating element or cooling element as well as at least a first temperature sensor are provided on a first measuring tube, and that at least a second heating element or cooling element as well as at least a second temperature sensor are provided on a second measuring tube, in mirror symmetric arrangement.

As was already explained above, the steps of supplying or removing heat (step A)), registering the temperature (step B)) as well as determining a corresponding comparison variable can be performed on all measuring tubes provided in a flow measuring device; for example, on two measuring tubes, on four measuring tubes, etc. The comparison values obtained in such case can then be compared with one another. Therefrom, it can in turn be ascertained whether a measuring tube is plugged, and if so, which of the measuring tubes is/are plugged.

In a further development, it is provided that both in the case of the first measuring tube, as well as also in the case of at least a second measuring tube, based on the supplying of heat or removing heat as well as on the temperature registering, a flow rate through the respective measuring tube is determined in each case, and these comparison variables are then compared with one another. In such case, as is explained above, especially methods and measuring arrangements known from thermal mass flow measurement can be applied.

In a further development, in the step of supplying or removing heat, in the case of the first measuring tube, in each case, an amount of heat is supplied or removed equal to that supplied or removed in the case of the second measuring tube. The first and the second comparison variable are then in each case formed by at least one temperature (or by at least one temperature value) registered in the region of the respective measuring tube after discontinuing the supplying or removing of heat. In the case of this further development, the heating rate or cooling rate in the case of the first and the second measuring tube need not absolutely be exactly equal. As is evident to those skilled in the art, for a reliable detection of plugging, it is, however, sensible that the respective amount of heat in the case of the first and in the case of second measuring tube is supplied over a comparable or similar length of time, so that additional, time-related effects do not affect the result of the comparison. Preferably, the amount of heat is supplied or removed in the case of the first and the second measuring tube in parallel, or at the same time. By registering the temperature, a measure for the heat transport by the medium in the respective measuring tube can be registered. The first and second comparison variable can, in such case, be temperatures registered directly after—or, alternatively, offset by a predetermined time interval to—the discontinuation of the supplying or removing heat. The first and second comparison variables can, however, also in each case be formed as a time curve of the temperature drop or temperature rise after suspension of the supplying or removing heat.

In a further development, in the step of supplying or removing heat, an equal amount of heat per time unit is supplied or removed in the case of the first measuring tube as is supplied or removed in the case of second measuring tube. The first and the second comparison variable are in each case formed by at least one temperature registered in the region of the respective measuring tube during and/or at a time after supplying or removing heat. Since, according to this further development, the heating or cooling in the case of the first and the second measuring tubes already occurs at an equal heating or cooling rate, the temperature can, supplementally or alternatively to the variants explained above, also be registered during the heating or cooling procedure, and be taken into consideration as a measure for the heat transport by the medium in the respective measuring tube. As is explained above, during this heating or cooling procedure, in corresponding manner, an individual temperature value registered at the particular measuring tube or also a time curve of the temperature rise or temperature drop in the region of the respective measuring tube can also be taken into consideration as a comparison variable. If the comparison variable is formed by temperature registered at a time after supplying or removing heat, reference should be made to the various variants explained above. In a further development, in the step of supplying or removing heat, in the case of the first and in the case of second measuring tube, in each case, such an amount of heat per time unit is supplied or removed that temperature registered in the region of the first measuring tube corresponds to temperature registered in the region of the second measuring tube. The first and the second comparison variable are in each case formed by the amount of heat supplied to the respective measuring tube. In the case of this further development, the amount of heat supplied or removed in the region of a measuring tube in order to achieve a particular temperature rise or temperature drop in the region of this measuring tube is taken into consideration as a measure for the heat transport by the medium in the respective measuring tube. In a further development, the steps of supplying or removing heat (step A)), registering temperature (step B)), the determining and comparing (step C)) as well as the detecting (step D)) are performed in the flow measuring device. For this, especially a correspondingly embodied electronics is provided in the flow measuring device. Fundamentally, however, it is also possible that parts of the method of the invention are performed in a superordinated control unit which is in communicative connection with the flow measuring device via a network, or that they are controlled from this control unit. In a further development, the steps of supplying or removing heat (step A)), registering temperature (step B)), the determining and comparing (step C)) as well as the detecting (step D)) are performed in parallel with a flow measurement performed in the flow measuring device. Accordingly, a flow measurement is not interrupted for performing the detection method of the invention. Especially, the flow measurement performed in parallel can be a Coriolis mass flow measurement, a density measurement and/or a viscosity measurement.

In a further development, in the case in which plugging of at least one measuring tube of the measuring transducer is detected, this plugging is signaled to a user and/or to a control unit in communicative connection with the flow measuring device. The signaling to a user can occur, for example, via an on-site display of the flow measuring device and/or via a signal tone of the flow measuring device. In plants of process automation technology, the control unit is, as a rule, in communicative connection with the flow measuring device (and, as a rule, also with additional field devices) via a network (e.g. a fieldbus network). With respect to the field devices associated with it, the control unit can, in such case, for example, perform process control and/or process monitoring.

The present invention additionally relates to a flow measuring device, via which at least one physical measured variable—especially mass flow, density and/or viscosity of the medium—of a medium flowing in a pipeline is determinable, wherein the flow measuring device has a measuring transducer of vibration-type having at least two measuring tubes connected for parallel flow and excitable, during use, to execute mechanical oscillations. Additionally, the flow measuring device includes 1) at least a first heating element, via which heat is suppliable to a medium conveyed during use in a first measuring tube, or includes at least a first cooling element, via which heat is removable from a medium conveyed during use in a first measuring tube; 2) at least a first temperature sensor arranged in the region of the first measuring tube, this sensor being thermally coupled to the medium conveyed during use in the first measuring tube; and 3) an electronics of the flow measuring device, which is embodied in such a manner that through this, based on a heat supplying via the first heating element or a heat removing via the first cooling element, as well as on temperature registering by the first temperature sensor, a first comparison variable, which is characteristic for heat transport by the medium in the first measuring tube, is determinable during use, and the determined first comparison variable is comparable with a reference variable, and in such a manner that via the electronics, plugging of at least one measuring tube of the measuring transducer is detectable, if the first comparison variable deviates from the reference variable by more than a limit value.

The further developments and variants explained above in reference to the method of the invention are also implementable In corresponding manner in the flow measuring device of the invention. In the case of the above explained method steps, in so far as this is technically possible, the electronics of the flow measuring device is especially embodied for performing the corresponding step and/or for operating a corresponding functional unit (of the flow measuring device) for performing the step. The electronics can, in such case, work in a digital and/or analog manner. In connection with the flow measuring device, all functional units—such as, for example, the heating element, the cooling element, the temperature sensor, etc.—which are associated with the first measuring tube are in each case referred to as "first" functional units. In corresponding manner, hereinafter, all functional units, which are associated with the second measuring tube are referred to as "second" functional units. The flow measuring device is especially embodied as a Coriolis flow measuring device.

In a further development, the flow measuring device includes at least a second heating element, via which heat is suppliable to a medium conveyed during use in at least a second measuring tube, or includes at least a second cooling element, via which heat is removable from a medium conveyed during use in at least a second measuring tube, and includes at least a second temperature sensor arranged in the region of the second measuring tube, this sensor being thermally coupled to the medium conveyed during use in the second measuring tube. The electronics of the flow measuring device is in such case embodied in such a manner that, based on a heat supplying via the second heating element or a heat removing via the second cooling element, as well as on temperature registering by the second temperature sensor, a second comparison variable, which is characteristic for heat transport by the medium in the second measuring tube, is determinable, and this second comparison variable is taken into consideration as a reference variable for comparison with the first comparison variable.

In a further development, the at least one first temperature sensor is provided on the first measuring tube, and the at least one second temperature sensor is provided on the second measuring tube. In such case, as is explained above, it can in each case be provided that the temperature sensor is placed within the respective measuring tube, or also on the inside or the outside of the measuring tube wall of the respective measuring tube. In a further development, at least one heating element is also operable as temperature sensor.

BRIEF DESCRIPTION OF THE DRAWINGS

Other advantages and utilities of the invention will become evident based on the following description of forms of embodiment with reference to the appended drawing. The figures of the drawing show as follows.

DETAILED DISCUSSION IN CONJUNCTION WITH THE DRAWINGS

Figure 1:
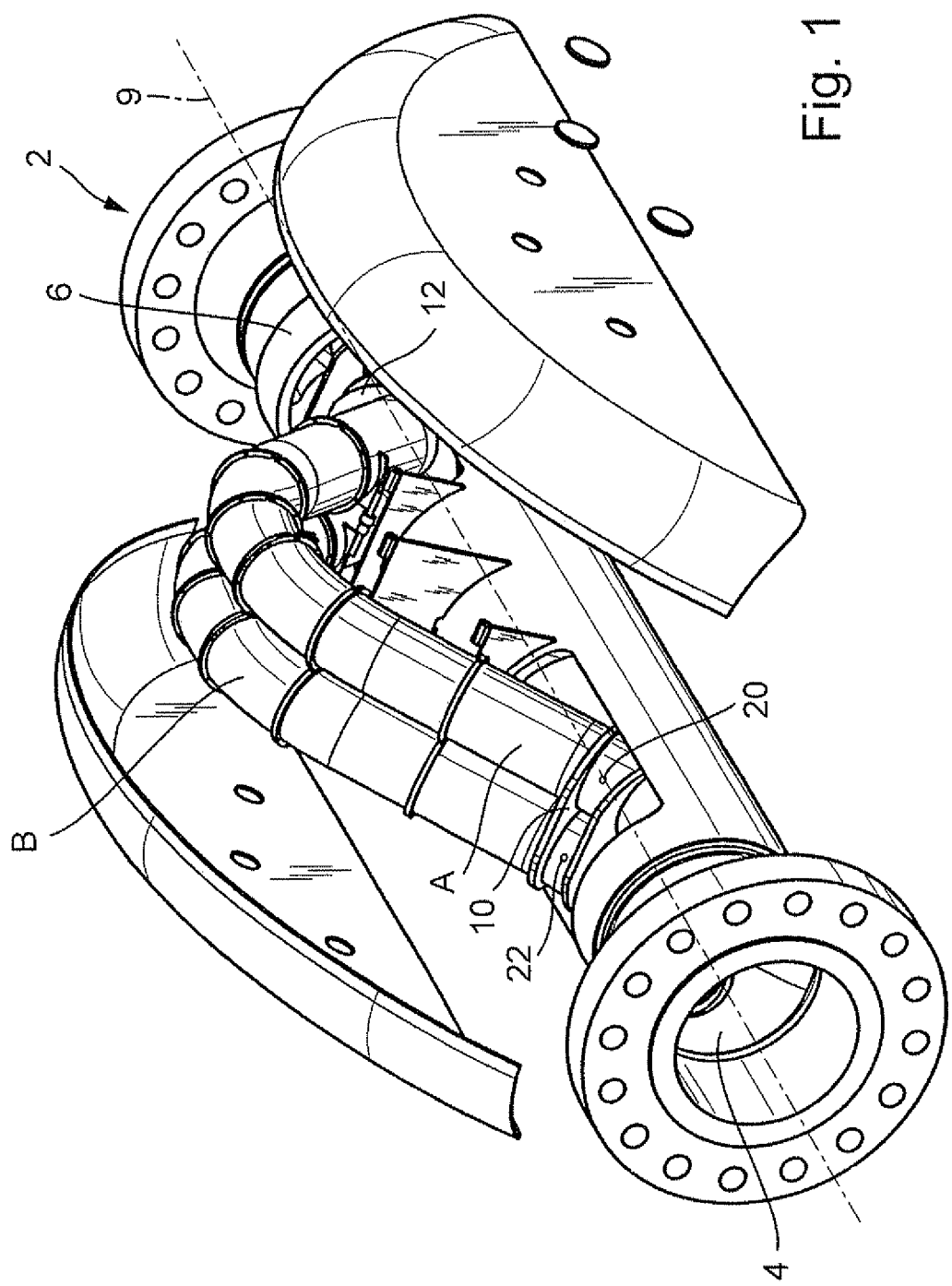
FIG. 1 is a schematic representation of a flow measuring device in perspective view, with partially removed housing for illustrating a form of embodiment of the present invention.
Figure 2:
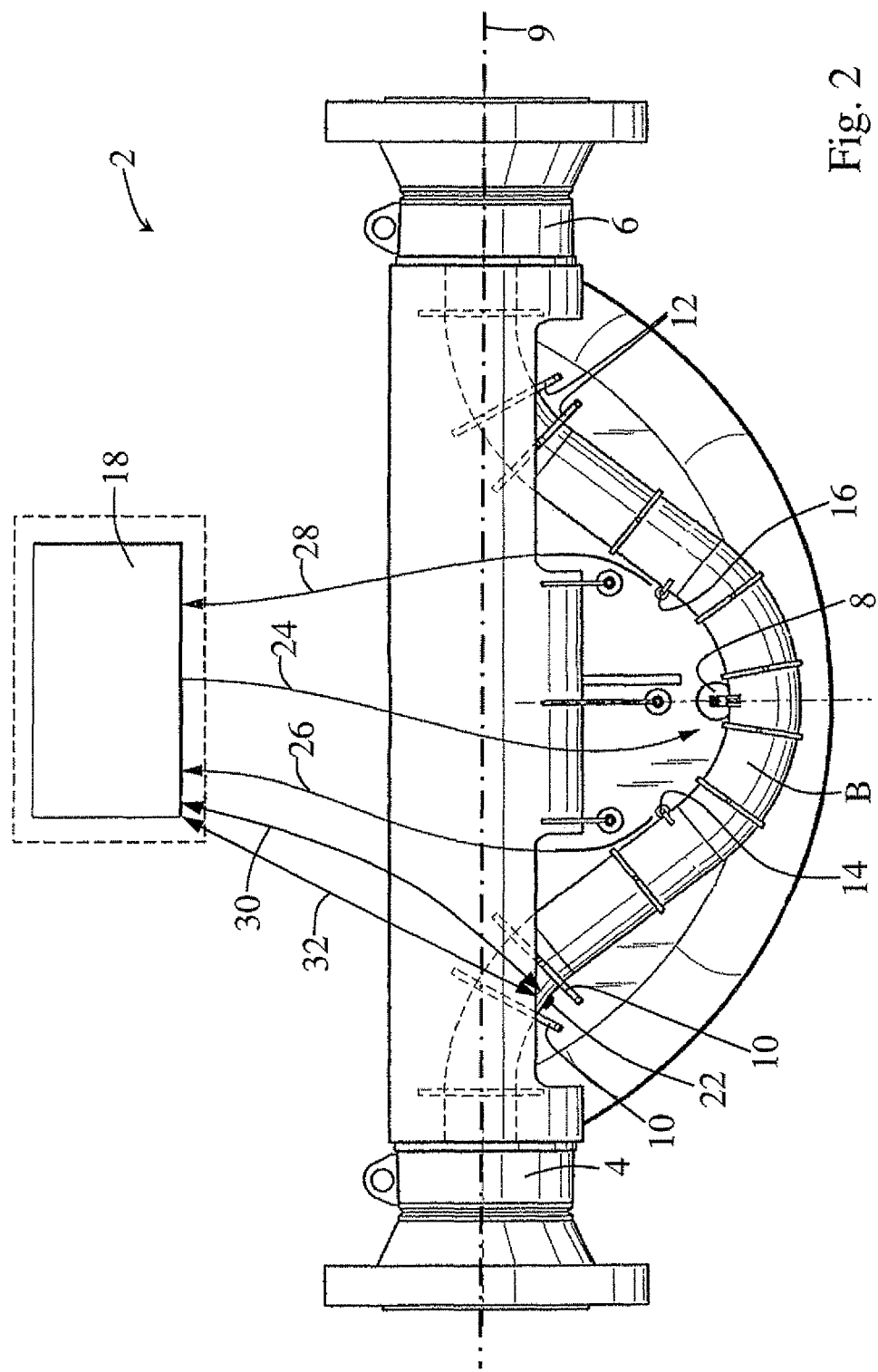
FIG. 2 is a side view of the flow measuring device illustrated in FIG. 1, with partially removed housing.

In FIGS. 1 and 2, there is presented, by way of example, a flow measuring device 2, which is embodied for performing the detection method of the invention. The flow measuring device 2 includes two measuring tubes A and B held in an oscillatable manner. Each tube has a curvature. The tubes extend parallel to one another. flow measuring device 2 is in such case insertable into a pipeline (not shown) in such a manner that the two measuring tubes A and B are flowed through by the medium flowing in the pipeline. For this, flow measuring device 2 has, on the inlet side, a flow divider 4, via which the medium is divided between the two measuring tubes A and B. On the outlet side, a flow divider 6 is provided in a corresponding manner, via which the medium emerging from the two measuring tubes A and B is led together again, and is led to an outlet of Coriolis flow measuring device 2.

Between the two measuring tubes A and B extends an exciter 8, which, in the present example of an embodiment is an electrodynamic exciter 8. The exciter 8 is in the present example of an embodiment arranged on a peak of the arc formed in each case by the two measuring tubes A and B. The exciter 8 is embodied in such a manner that its length is changed via application of an electrical excitation voltage. Via application of a corresponding periodic electrical excitation voltage on the exciter 8, the two measuring tubes A and B can periodically be pushed apart and/or drawn together, so that they execute bending oscillations. In such case, the two measuring tubes A and B are excited with opposite phase relative to one another, and in each case execute a swinging movement (opposite phase relative to one another) about a longitudinal axis 9 of the flow measuring device 2. The two measuring tubes A and B are additionally mechanically coupled to one another on the inlet side and on the outlet side by corresponding coupling elements 10, 12.

Between the two measuring tubes A and B, respectively, at an inlet side and at an outlet side section of such, extend two oscillation sensors 14, 16, via whose length change, mechanical oscillations of the two measuring tubes A and B are registerable. In the present example of an embodiment, via the two oscillation sensors 14, 16, the distance change between the two measuring tubes A, B—i.e. their combined amplitude—is registerable in each case. The oscillation sensors 14, 16 are formed, for example, by electrodynamic oscillation sensors. The evaluation of the sensor signals (respectively, measuring signals) provided by oscillation sensors 14, 16, as well as the operating of exciter 8, occurs via a correspondingly embodied electronics 18, which is only schematically shown by a box in FIG. 2. The operating of the exciter 8 by the electronics 18 is schematically presented in FIG. 2 by the arrow 24, while the providing of the sensor signals by oscillation sensors 14, 16 to electronics 18 in FIG. 2 is schematically presented by the arrows 26, 28.

The flow measuring device 2 is in the present case formed by a Coriolis flow measuring device. Accordingly, via flow measuring device 2, a mass flow of the medium flowing in the respective pipeline is determinable. For this, via the two oscillation sensors 14, 16, among other things, a phase shift of the oscillations of measuring tubes A, B along the direction of elongation of the two measuring tubes A, B is registered. From the registered phase shift, the mass flow can then be ascertained in electronics 18. Flow measuring device 2 is embodied in such a manner that through this, a density as well as a viscosity of the flowing medium also are determinable.

In the case of high viscosity media and/or those tending to form accretions, it can occur that one of the measuring tubes A, B becomes completely or partially plugged. So long as a(n accordingly increased) flow is still possible through the remaining measuring tube A or B, plugging of a measuring tube A or B is not recognizable in the context of a Coriolis mass flow measuring. In order to be able to perform the detection method of the invention for detecting plugging of a measuring tube A, B, on each measuring tube A, B, a heating element 20, 22 is provided. Heating elements 20, 22 are in each case arranged in an inlet side section of measuring tubes A, B, on a measuring tube wall of such. In the case of the present form of embodiment, the heating elements are in each case arranged on the outside of the measuring tube wall (which is formed of a metallic material, and therewith one capable of conducting heat well) and are therewith thermally coupled via the measuring tube wall with the medium conveyed in the respective measuring tube A or B. Alternatively, it can be provided that heating elements 20, 22 partially or completely extend through the measuring tube wall and, in given cases, are in direct contact with the medium conveyed in the respective measuring tube A, or B.

Heating elements 20, 22 are embodied as resistance heating elements, whose heating operation is controlled from the electronics 18. During the heating operation of the two heating elements 20, 22, via the first heating element 20, heat is supplied to a medium conveyed in the first measuring tube A, while via the second heating element 22, heat is supplied to a medium conveyed in the second measuring tube B. At least at the times at which no heating operation is performed, heating elements 20, 22 are also operable as temperature sensors 20, or 22. A corresponding operating occurs, in turn, via electronics 18, by which the measuring signals of the temperature sensors 20, 22 also are evaluated. During operation as temperature sensors 20, 22, temperature is registered via the first temperature sensor 20, which is thermally coupled (via the measuring tube wall) to the medium conveyed in the first measuring tube A, and temperature is registered via the second temperature sensor 22, which is thermally coupled (via the measuring tube wall) to the medium conveyed in the second measuring tube B. The processes of operating heating elements 20, 22 or temperature sensors 20, 22 by the electronics 18 as well as the providing of the measuring signals of temperature sensors 20, 22 to the electronics are schematically presented in FIG. 2 by the arrows 30, 32.

Figure 3:
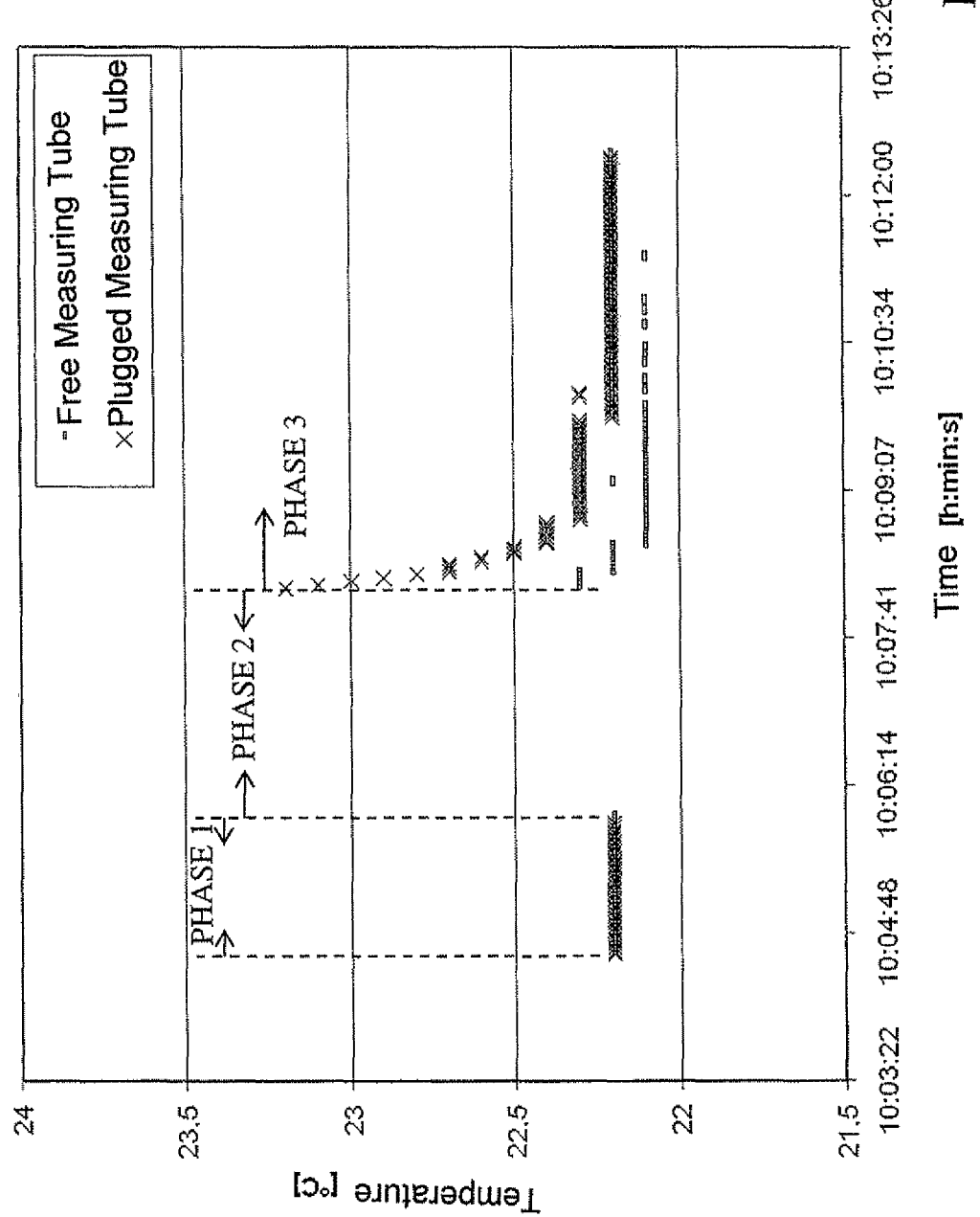
FIG. 3 is a graphical plotting of measured temperature values versus time for illustrating a form of embodiment of the invention.

In the following, a first form of embodiment of the detection method of the invention will be explained with additional reference to FIG. 3. In FIG. 3, the temperature values registered by the two temperature sensors 20, 22 are presented versus time. In such case, the time is plotted on the x-axis as clock time (in hours: minutes: seconds), while the temperature (in ° C.) is plotted on the y-axis. In an experimental arrangement, a measuring tube (here measuring tube A) was plugged with a rubber plug, while the second measuring tube (measuring tube B) still allowed a free flow of the medium (here water). In the graphical representation of FIG. 3, the temperature values registered by the temperature sensor 20 (of the plugged measuring tube) are represented by instances of the letter x, while the temperature values registered by the temperature sensor 22 (of the free measuring tube B) are represented by rectangles. At the beginning of the experiment, the temperature values registered by the two temperature sensors 20, 22 are essentially identical (phase 1 in FIG. 3).

Next, the two heating elements 20, 22 are operated by the electronics in such a manner that these elements in each case heat with the same heating power (or heating rate) over an equal time period (phase 2 in FIG. 3). During this operational phase, no temperature value is available to the two temperature sensors 20, 22 in the case of the present experimental arrangement.

Directly after discontinuance of the heating operation, the temperature measurement is begun by the two temperature sensors 20, 22 (phase 3 in FIG. 3). As is evident from FIG. 3, directly after discontinuance of the heating operation, the temperature is already markedly higher in the case of the plugged measuring tube A than in the case of the free measuring tube B. This is to be attributed to the fact that during the heating phase, due to of the flow of medium in the free measuring tube B, the heat transport is markedly higher than in the case of the plugged measuring tube A. Furthermore, in the case of the respective curves of the temperature values in phase 3, it is to be observed that the temperature values of the second temperature sensor 22 in the case of the free measuring tube B decrease markedly faster and accordingly level off to the original temperature value faster than the temperature values registered by the first temperature sensor 20 in the case of the plugged measuring tube A.

In a first form of embodiment of the invention, temperature value registered by the first temperature sensor 20 of the first measuring tube A directly after discontinuation of the heating operation is used as a first comparison variable. In corresponding manner, temperature value registered by the second temperature sensor 22 directly after discontinuation of the heating operation is used as a second comparison variable (reference variable for comparison with the first comparison variable). As can be seen based on the explanation above, the first comparison variable is characteristic for heat transport by the medium in the first measuring tube A, while the second comparison variable is characteristic for heat transport by the medium in the second measuring tube B. Via the electronics 18, the first comparison variable is compared with the second comparison variable. In the present case, the comparison yields the result that the first comparison variable deviates from the second comparison variable (or reference variable) by more than a limit value stored in electronics 18, so that plugging of a measuring tube is detected by electronics 18.

Via electronics 18, based on the direction of deviation of the first comparison variable from the second comparison variable, it is additionally detected that an increased heat transport by the medium occurs in the second measuring tube B, while in the first measuring tube A, a reduced heat transport by the medium occurs. Accordingly, plugging of the first measuring tube A is detected by electronics 18. This is signaled to a user via an on-site display (not shown in the Figs.) provided on the flow measuring device 2. Additionally, a control unit (not shown) in communicative connection with the flow measuring device 2 is informed of the plugging the measuring tube A. At times at which the detection method of the invention is not performed, at least one of the temperature sensors 20, 22 can be used for temperature registering for temperature compensation in the case of the flow measurement occurring in parallel (for example, for determining the mass flow, the density and/or the viscosity of the medium).

In the following, other forms of embodiment of the invention will now be explained, wherein primarily the differences in comparison to the first form of embodiment are explored. In a second form of embodiment, as first comparison variable, a time curve of the temperature drop of temperature values registered by the first temperature sensor 20 at the first measuring tube A is used, and as second comparison variable, a time curve of the temperature drop of the temperature values registered by the second temperature sensor 22 at the second measuring tube B is used. In such case, a predetermined time interval of phase 3 illustrated in FIG. 3 (i.e. after discontinuation of the heating operation) can especially be taken into consideration for the comparison.

In a third form of embodiment, temperature in the region of the first measuring tube A as well as temperature in the region of the second measuring tube B is registered during the heating operation (compare phase 2 in FIG. 3). In given cases, for this, in addition to heating elements 20, 22, corresponding temperature sensors (not shown in the Figs.) must be provided, which are correspondingly thermally coupled to the medium conveyed in the respective measuring tube A or B. In this case, a time curve of the temperature rise—or also an individual temperature value registered after a predetermined time (measured from the start of the heating operation)— which is registered by a first temperature sensor on the first measuring tube A, can be used as a first comparison variable. In corresponding manner, a time curve of the temperature rise—or also an individual temperature value registered after a predetermined time (from the start of the heating operation)—which is registered by a second temperature sensor on the second measuring tube B, can be used as a second comparison variable.

In a fourth form of embodiment, similar to the case of the third form of embodiment, parallel to heating operation via heating elements 20, 22, the temperature in the region of the respective measuring tubes A, B is also registered via corresponding temperature sensors. In such case, electronics 18 controls the two heating elements 20, 22 as a function of the temperatures registered in the region of the respective measuring tubes A, B in such a manner that temperature registered in the region of the first measuring tube A corresponds to temperature registered in the region of the second measuring tube B. A predetermined temperature profile is especially run through. In such case, as a first comparison variable, an amount of heat supplied by the first heating element 20 during a predetermined time interval (for example, beginning with the start of the heating operation and ending after a predetermined time period or upon reaching a predetermined temperature value) is used. As a second comparison variable, an amount of heat supplied by the second heating element 22 during this predetermined time interval is used.

In the case of all forms of embodiment explained above, a mirror-symmetric embodiment of measuring tubes A, B and a corresponding mirror-symmetric embodiment of heating elements 20, 22 as well as the temperature sensors is provided. The symmetry plane extends, in such case, between the two measuring tubes. This is especially preferable since, due to this symmetry, measured values (temperature values, heat amounts, etc.) registered with respect to the respective measuring tubes are directly comparable.

The present invention is not limited to the examples of embodiments explained with reference to the figures. Especially in the case of the construction illustrated in the Figs., heating elements 20, 22 or temperature sensors 20, 22 are in each case arranged on an inlet side section of measuring tubes A, B. Alternatively, they can also be provided on a central section or on an outlet side section of measuring tubes A, B. Additionally, the forms of embodiment explained above can be performed in corresponding manner on only one measuring tube (e.g. the first measuring tube A). The first comparison variable obtained in such case can then be compared with a predetermined reference variable, which, for example, is stored in a memory of flow measuring device 2.

The invention claimed is:

1. A method for detecting complete or partial plugging of a measuring tube of a measuring transducer of vibration-type of a Coriolis flow measuring device, said measuring transducer being flowed through by a medium and said measuring transducer including at least two measuring tubes connected for parallel flow and at least two oscillation sensors arranged spaced from one another along a direction of elongation of the measuring tubes, said method comprising:
   exciting said measuring tubes to execute mechanical oscillations for producing Coriolis forces in said medium flowing through;
   using said at least two oscillation sensors for registering oscillations of the measuring tubes for registering, according to the Coriolis principle, a mass flow rate of the medium;
   supplying, by means of at least one heating element, heat to the medium conveyed in a first measuring tube or removing, by means of at least one cooling element, heat from the medium conveyed in the first measuring tube;
   registering temperature by means of at least one temperature sensor, which is thermally coupled to the medium conveyed in the first measuring tube;
   determining a first comparison variable, which is characteristic for heat transport by the medium in the first measuring tube, based on the supplying of heat or the removing of heat, and the registering of temperature, and comparing said first comparison variable with a reference variable; and
   detecting plugging of at least one measuring tube of the measuring transducer, if the first comparison variable deviates from the reference variable by more than a limit value.

2. The method as claimed in claim 1, wherein:
   the reference variable is a variable which was determined earlier and can be called up from a memory.

3. The method as claimed in claim 1, comprising the further steps of:
   detecting plugging of the first measuring tube, when said determined first comparison variable deviates from the reference variable in such a manner that a reduced heat transport by the medium occurs in the first measuring tube; and/or
   detecting plugging of at least one other measuring tube of the flow measuring device, when said determined first comparison variable deviates from the reference variable in such a manner that an increased heat transport by the medium occurs in the first measuring tube.

4. The method as claimed in claim 1, wherein:
   the first comparison variable is a flow rate through the first measuring tube determined based on the supplying of heat or removing of heat as well as on the temperature registering, and the reference variable is a flow rate expected for the first measuring tube, which is determined based on said mass flow rate registered according to the Coriolis principle.

5. The method as claimed in claim 1, wherein:
   said steps of supplying or removing heat as well as registering temperature are performed in corresponding manner on at least a second measuring tube of the measuring transducer, based thereon, at least a second comparison variable, which is characteristic for heat transport by medium in the second measuring tube, is determined, and such second comparison variable is taken into consideration as a reference variable for comparison with the first comparison variable.

6. The method as claimed in claim 5, wherein:
in said step of supplying or removing heat, in the case of the first measuring tube, an equal amount of heat is supplied or removed compared to that supplied or removed in the case of the second measuring tube, and first and the second comparison variables are in each case formed by at least one temperature in the region of the respective measuring tube registered after discontinuation of the supplying or removing of heat.

7. The method as claimed in claim 5, wherein:
in said step of supplying or removing heat, an equal amount of heat per time unit is in each case supplied or removed in the case of the first measuring tube as is supplied or removed in the case of second measuring tube, and the first and the second comparison variables are in each case formed by at least one temperature registered in region of the respective measuring tube during and/or at a time after supplying or removing heat.

8. The method as claimed in claim 5, wherein:
in said step of supplying or removing heat, in the case of the first and in the case of second measuring tube, in each case, such an amount of heat per time unit is supplied or removed that temperature registered in the region of the first measuring tube corresponds to temperature registered in the region of the second measuring tube, and the first and the second comparison variables are in each case formed by an amount of heat supplied to the respective measuring tube.

9. The method as claimed in claim 1, wherein:
said steps of supplying or removing heat, registering a temperature, determining and comparing, as well as the detecting, are performed in the flow measuring device.

10. The method as claimed in claim 1, wherein:
said steps of supplying or removing heat, registering a temperature, determining and comparing, as well as detecting are performed in parallel with a flow measurement performed in the flow measuring device.

11. The method as claimed in claim 1, wherein:
in the case, in which plugging of at least one measuring tube of the measuring transducer is detected, such plugging is signaled to a user and/or to a control unit in communicative connection with the flow measuring device.

12. A flow measuring device, via which at least one physical measured variable of a medium flowing in a pipeline is determinable—especially mass flow, density and/or viscosity of the medium—wherein the flow measuring device includes a measuring transducer of a vibration-type with at least two measuring tubes connected for parallel flow and excitable, during use, to execute mechanical oscillations, said flow measuring device comprising:
at least a first heating element, via which heat is suppliable to the medium conveyed during use in a first measuring tube;
at least a first temperature sensor arranged in the region of the first measuring tube, which is thermally coupled to the medium conveyed during use in the first measuring tube; and
electronics adapted to detect, based on a heat supplying via said at least said first heating element, as well as on temperature registering by said at least said first temperature sensor, plugging of at least one of said at least two measuring tubes of the measuring transducer, wherein:
the electronics is adapted to determine a first comparison variable, which is characteristic for heat transport by the medium in the first measuring tube and to compare the determined first comparison variable with a reference variable; and the electronics is adapted to detect plugging of at least one measuring tube of the measuring transducer, if the first comparison variable deviates from the reference variable by more than a limit value.

13. The flow measuring device as claimed in claim 12, wherein:
said flow measuring device includes at least a second heating element, via which heat is suppliable to the medium conveyed during use in at least a second measuring tube and at least a second temperature sensor arranged in the region of the second measuring tube and thermally coupled to the medium conveyed during use in the second measuring tube,
and the electronics of said flow measuring device is adapted to determine, based on heat supplying via said second heating element as well as on temperature registering by said second temperature sensor, a second comparison variable, which is characteristic for heat transport by the medium in said second measuring tube, and to use said second comparison variable as said reference variable.

14. The flow measuring device as claimed in claim 12, wherein:
said at least one first temperature sensor is provided on the first measuring tube, and said at least one second temperature sensor is provided on the second measuring tube.

15. The flow measuring device as claimed in claim 12, wherein:
at least one heating element is also operable as a temperature sensor.

16. A flow measuring device, via which at least one physical measured variable of a medium flowing in a pipeline is determinable—especially mass flow, density and/or viscosity of the medium—wherein the flow measuring device includes a measuring transducer of a vibration-type with at least two measuring tubes connected for parallel flow and excitable, during use, to execute mechanical oscillations, said flow measuring device comprising:
at least a first cooling element, via which heat is removable from medium conveyed during use in a first measuring tube;
at least a first temperature sensor arranged in the region of the first measuring tube, which is thermally coupled to the medium conveyed during use in the first measuring tube;
and electronics adapted to detect, based on a heat removing via said first cooling element, as well as on temperature registering by said at least said first temperature sensor, plugging of at least one of said at least two measuring tubes of the measuring transducer, wherein:
the electronics is adapted to determine a first comparison variable, which is characteristic for heat transport by the medium in the first measuring tube and to compare the determined first comparison variable with a reference variable, and the electronics is adapted to detect plugging of at least one measuring tube of the measuring transducer, if the first comparison variable deviates from the reference variable by more than a limit value.

17. The flow measuring device as claimed in claim 16, wherein:
said flow measuring device includes at least a second cooling element, via which heat is removable from medium conveyed during use in at least a second measuring tube, and at least a second temperature sensor arranged in the region of the second measuring tube and thermally coupled to the medium conveyed during use in the second measuring tube, and the electronics of said flow measuring device is adapted to determine, based on heat removing via said second cooling element, as well as on temperature registering by said second temperature sensor, a second comparison variable, which is characteristic for heat transport by the medium in said second measuring tube and to use said second comparison variable as said reference variable.

* * * * *